United States Patent [19]
Bixler

[11] 3,878,100
[45] Apr. 15, 1975

[54] SEPARATION MEDIUM

[75] Inventor: Harris J. Bixler, Camden, Maine

[73] Assignee: Marine Colloids, Inc., Rockland, Maine

[22] Filed: Feb. 1, 1973

[21] Appl. No.: 328,843

[52] U.S. Cl. ................ 210/198 C; 117/8; 210/502
[51] Int. Cl. ............................................ B01d 15/08
[58] Field of Search .............. 210/31 C, 198 C, 502; 117/8

[56] References Cited
UNITED STATES PATENTS

| | | | |
|---|---|---|---|
| 2,380,762 | 7/1945 | Jackson | 117/8 X |
| 2,565,491 | 8/1951 | Francis, Jr. | 117/8 X |
| 2,785,739 | 3/1957 | McGragon et al. | 117/8 X |
| 3,318,451 | 5/1967 | Przvbrlowicz et al. | 210/198 C |
| 3,511,775 | 5/1970 | Collins | 210/198 C X |
| 3,623,602 | 11/1971 | Valente | 210/198 C X |

OTHER PUBLICATIONS

Thin–Layer Chromatography An Annointed Bibliography: 1964–1968 By Haywood Ann Arbor Science Publishers, Inc., Ann Arbor, Mich. 1968.

*Primary Examiner*—John Adee

[57] ABSTRACT

A thin layer medium for use in molecular diffusion or affinity separation processes having a layer of hydrated gel material, the surface of which is scored or cross-scored at intervals of 0.05 to 1 millimeter. The medium may be maintained wet until used or it may be dried for storage and rehydrated before use.

12 Claims, 2 Drawing Figures

SEPARATION MEDIUM

This invention relates to a thin layer medium for use in molecular diffusion or affinity separation processes and pertains more particularly to a layer of hydratable or hydrated gel material having a surface scored or cross-scored to provide a number of upstanding localized zones separated from each other at the surface but connected to an integral underlining mass of material which is capable of acting as a reservoir for an aqueous medium.

Thin layer media have been used in a variety of molecular diffusion separation processes; for most effective and efficient use, particularly when employed for routine analyses, for example, for quality control or clinical analysis purposes, it is important that the media be prepared in advance and that they be of uniform quality and dimensions. This has been accomplished to a limited extent by providing media in the form of a continuous layer or sheet of dry hydratable material which needs only brief immersion in an aqueous medium, e.g., an aqueous buffer solution to cause it to absorb the aqueous medium and swell to form a gel of the desired dimensions and properties. In addition, previously hydrated gel sheets prepared under carefully controlled conditions have been available commercially but require special precautions in packaging and shipping. However, for some purposes it is desirable to have the medium in the form of a bed or layer of small grains or particles to provide a large surface area in a compact mass; it has generally been necessary to form such media immediately before use from a supply of granular material, a procedure which makes it difficult to provide such beds or layers of uniform and reproducible properties. In addition, such beds or layers have the disadvantage that they are capable of containing only a limited amount of absorbed solution such as buffer solution, whereas for certain purposes a large supply of such solution may be required.

The present invention provides the advantages of a medium in the form of a bed or layer of small grains or particles having a large surface area without the disadvantage of having to prepare such a bed immediately before use and at the same time having the advantages of easy shipment and storage and the advantage of a continuous gel layer or sheet which serves to provide a reservoir of aqueous medium in immediate contact with the particles during use of the medium. The medium of the present invention is useful in a variety of molecular diffusion or affinity separation procedures including chromatographic and electrophoretic processes, and including radioimmunoassay procedures. While the medium is preferably in the dry form for convenience in shipping and storing, being hydrated simply by immersion in water shortly before use, it can also be maintained in hydrated form for shipping and storing by packaging in moisture-tight containers.

Figure 1:
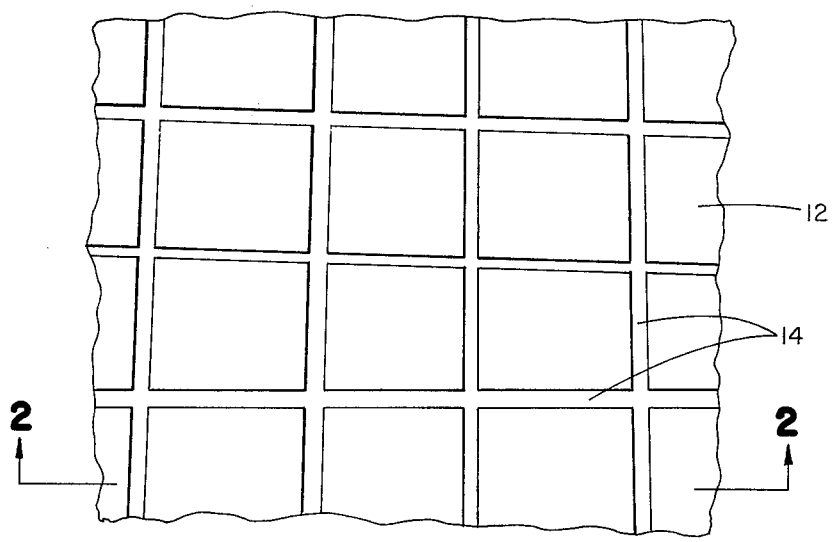
FIG. 1 is a plan view showing one embodiment of the present invention.
Figure 2:
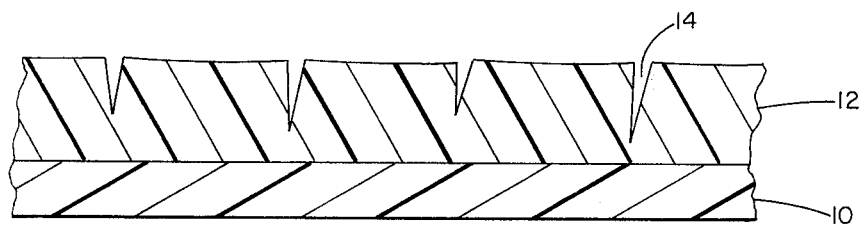
FIG. 2 is a view in cross-section along line 2—2 of FIG. 1.

As shown in the drawing, the medium comprises an optional supporting member 10 of glass or of flexible but stiff material such as polyethylene terephthalate or other material inert to the aqueous media with which the medium is to be used. The supporting member serves merely to provide supplementary mechanical strength and coherence for the active medium. Bonded to one face of supporting member 10 is a layer 12 of hydratable or hydrated gel material which is scored or slit at 14 by means of a sharp instrument. Although the spacing between the score lines 14 is not critical, it is preferably and conveniently about 0.05 to 1 millimeter; the depth of the score lines is preferably at least 0.025 millimeter. Generally parallel scorings are preferred, but intersecting scorings transverse to each other as well as two or more intersecting sets of parallel scorings may also be used. The precise depth of the scorings is also not critical since the opposing side walls of each scoring tend to swell and to come into contact with each other adjacent the bottom of each scoring in any event during use of the medium. Although the scoring may extend all the way through the layer of gel material 12, it is preferred that it stop short of the bottom so that at least a portion (at least 10% of the thickness) of the sheet remains integral.

The thickness of the layer 12 of gel material is also not critical but it is desirable that it be at least 0.1 millimeter thick in order to provide an adequate reservoir of aqueous solution for transmission to the separate localized zones formed by scoring; the thickness need not exceed 2 millimeters, and for most purposes it is preferred that the thickness not exceed 1 millimeter.

The sheet or layer 12 may be composed of any of the hydratable or hydrated gel materials of which many are well known. Among such are the various cellulosic materials such as regenerated cellulose, hydroxypropyl cellulose, carboxymethyl cellulose, diethylaminoethyl cellulose, polyacrylamide, and a variety of polysaccharides including starch, dextran, agar, agarose, carrageenan and other water sorptive gel-forming solid materials. The gel-forming materials may contain sorbed or dispersed therein in addition to water, a variety of reagents or substances having a specific affinity for a particular component of the mixture which is to be subjected to a diffusion separation process by means of the medium; for example, the gel-forming material may contain antibodies or antigens, enzymes or substrates and other materials absorbed therein and/or bonded thereto. The reagents or substances having a specific affinity for one component of the mixture to be subjected to a separation process may be located in one area or zone of the sheet 12 while one or more additional zones may contain reagents or substances having a specific affinity for a different component of the mixture.

Particularly preferred as the material of which layer 12 is formed is agarose or a mixture of agarose with up to 70% by weight based on the weight of the agarose of an alginate such as sodium alginate, together with conventional modifiers or softeners such as sorbitol or other hexitols, polyethylene glycols, etc.

The layer 12 is formed by casting on the surface of supporting member 10 a film or layer of aqueous solution of gel-forming material and allowing it to set to a gel, for example by cooling. In many cases the gel materials can be dried for storage and subsequently rehydrated for use without loss of their desirable gel characteristics, as is well known to the art.

The layer 12 is preferably in dry form for storing and shipping, being hydrated by immersion in water immediately before use. However, it can be maintained in hydrated condition for storing and shipping provided it is properly packaged. The scoring operation may be carried out either while layer 12 is in hydrated gel form or it can be carried out while the layer is in dry form. There may be used for this purpose any sharp edged instrument such as a knife or scalpel, or even a razor blade. Equivalent results are achieved by cutting either by a movement across the surface of the layer 12 in the nature of slicing or by a movement substantially at a right angle to the surface, as in the case of die-cutting; a single cutting instrument can be used, or two or more cutting instruments can be mounted for simultaneous use to provide the desired spacing; equivalent results are also produced by using appropriately spaced cutting instruments as a casting surface or mold on which layer 12 is deposited in liquid form, allowed to gel, then stripped from the surface. The terms "scoring", "scored" and "cross-scored" in this specification and in the claims are intended to be generic terms defining the grooved or cut nature of the surface regardless of the particular procedure by which the surface is formed.

The following specific examples are intended to illustrate the nature of this invention without serving as a limitation upon its scope.

EXAMPLE 1

There was prepared an aqueous solution containing 1% by weight of agarose, 0.5% sodium alginate, 0.25% sorbitol and 0.15% polyethylene glycol (molecular weight 400). A 5 milliliter portion of this solution was spread on a polyethylene terephthalate support film approximately 2 ⅝ × 3 ¼ inches in dimensions to form a layer about 1 millimeter thick. It was allowed to stand at room temperature until it gelled, then dried at 40°C. in a forced hot air oven. Using a steel ruler and a scalpel parallel cuts or score lines were made in the surface of the dry film at closely spaced (ca. 0.5 millimeter) intervals and then an additional set of score lines crossing the first set at approximately right angles was made, the second set having approximately the same spacing as the first set. In each case the score lines penetrated approximately two-thirds of the thickness of the dried gel layer 12 to form in fact a layer of dried agarose particles separated from each other but bonded to the underlying dried layer or film of agarose as shown in the drawing.

The medium was useful for chromatographic separation. It was hydrated by immersion in water at room temperature for about an hour, after which, when supported in an inclined (ca. 45°) position, there was applied to the raised end a solution in an aqueous phosphate buffer of a mixture of Dextran Blue 2000 and of DNP aspartic acid dicyclohexylamine salt. Rapid separation of the components of the mixture occurred along the length of the medium under the influence of gravity. Similar results can be achieved by using the medium in horizontal position in a conventional electrophoretic device.

Similar results are obtained using other hydrated gel materials in place of the agarose composition. In each case, the separation is more rapid and more thorough than when the score lines are omitted.

What is claimed is:

1. A medium for use in applying molecular diffusion or affinity separation processes to a liquid composition, said medium comprising a thin layer plate of dried solid absorbent material hydratable to a gel, said layer having its surface scored at intervals of 0.05 to 1 millimeter.

2. A medium as claimed in claim 1 in which said thin layer plate is bonded to a support member.

3. A medium as claimed in claim 1 in which said thin layer plate is cross-scored.

4. A medium as claimed in claim 1 in which said thin layer plate consists essentially of a polysaccharide.

5. A medium as claimed in claim 4 in which said thin layer plate consists essentially of a mixture of agarose with up to 70% by weight of an alginate.

6. A medium for use in applying molecular diffusion or affinity separation processes to a liquid composition, said medium comprising a thin layer plate of hydrated gel absorbent material having its surface scored at intervals of 0.05 to 1 millimeter.

7. A medium as claimed in claim 6 in which said thin layer plate is bonded to a support member.

8. A medium as claimed in claim 6 in which said thin layer plate is cross-scored.

9. A medium as claimed in claim 6 in which said thin layer plate consists essentially of a polysaccharide.

10. A medium as claimed in claim 9 in which said thin layer plate consists essentially of a mixture of agarose with up to 70% by weight of an alginate.

11. The method of making a medium for use in applying molecular diffusion or affinity separation processes to a liquid composition, which method comprises forming a thin layer plate of hydrated gel absorbent material and scoring the surface of said thin layer plate at intervals of 0.05 to 1 millimeter.

12. The method as claimed in claim 11 in which the thin layer plate is dried after formation and the scoring is carried out on the dried thin layer plate.

* * * * *